(12) United States Patent　　(10) Patent No.: US 8,676,766 B2
Shiozawa et al.　　　　　　　　 (45) Date of Patent: Mar. 18, 2014

(54) COMPUTER-READABLE RECORDING MEDIUM STORING CLUSTER SYSTEM CONTROL PROGRAM, CLUSTER SYSTEM, AND CLUSTER SYSTEM CONTROL METHOD

(75) Inventors: Kensuke Shiozawa, Kawasaki (JP); Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 676 days.

(21) Appl. No.: 12/610,645

(22) Filed: Nov. 2, 2009

(65) Prior Publication Data

US 2010/0121823 A1　　May 13, 2010

(30) Foreign Application Priority Data

Nov. 7, 2008　 (JP) ................................. 2008-287083

(51) Int. Cl.
　　*G06F 17/30*　　　(2006.01)
(52) U.S. Cl.
　　USPC ............................ 707/674; 711/112; 709/237
(58) Field of Classification Search
　　USPC ............................ 707/674; 711/112; 709/237
　　See application file for complete search history.

(56) References Cited

U.S. PATENT DOCUMENTS

| 4,807,118 A * | 2/1989 | Lin et al. ........................ 709/237 |
| 7,676,628 B1 * | 3/2010 | Compton et al. ............. 711/114 |
| 2010/0121823 A1 * | 5/2010 | Shiozawa et al. ............. 707/674 |

OTHER PUBLICATIONS

B., Callaghan "NFS Illustrated", Dec. 17, 1999, 234-237.
S., Lawler "Active/Active Controller Configuration Overview and Best Practice Guidelines", Jan. 24, 2007, 1-21.
S., Tweedie "EXT3 Journaling Filesystem", Jul. 20, 2000.

* cited by examiner

*Primary Examiner* — Belix M Ortiz Ditren
(74) *Attorney, Agent, or Firm* — Fujitsu Patent Center

(57) ABSTRACT

A computer-readable recording medium stores a cluster system control program controlling a cluster system in which clustered nodes are connected to a shared disk having a journaling file system. The cluster system control program causes a computer to execute a request reply information generation procedure for, when a request is accepted from a client, generating request reply information including an identification number identifying the request and reply data to respond to the request from the client, and a saving procedure for saving the request reply information generated by the request reply information generation procedure in the journaling file system.

13 Claims, 6 Drawing Sheets

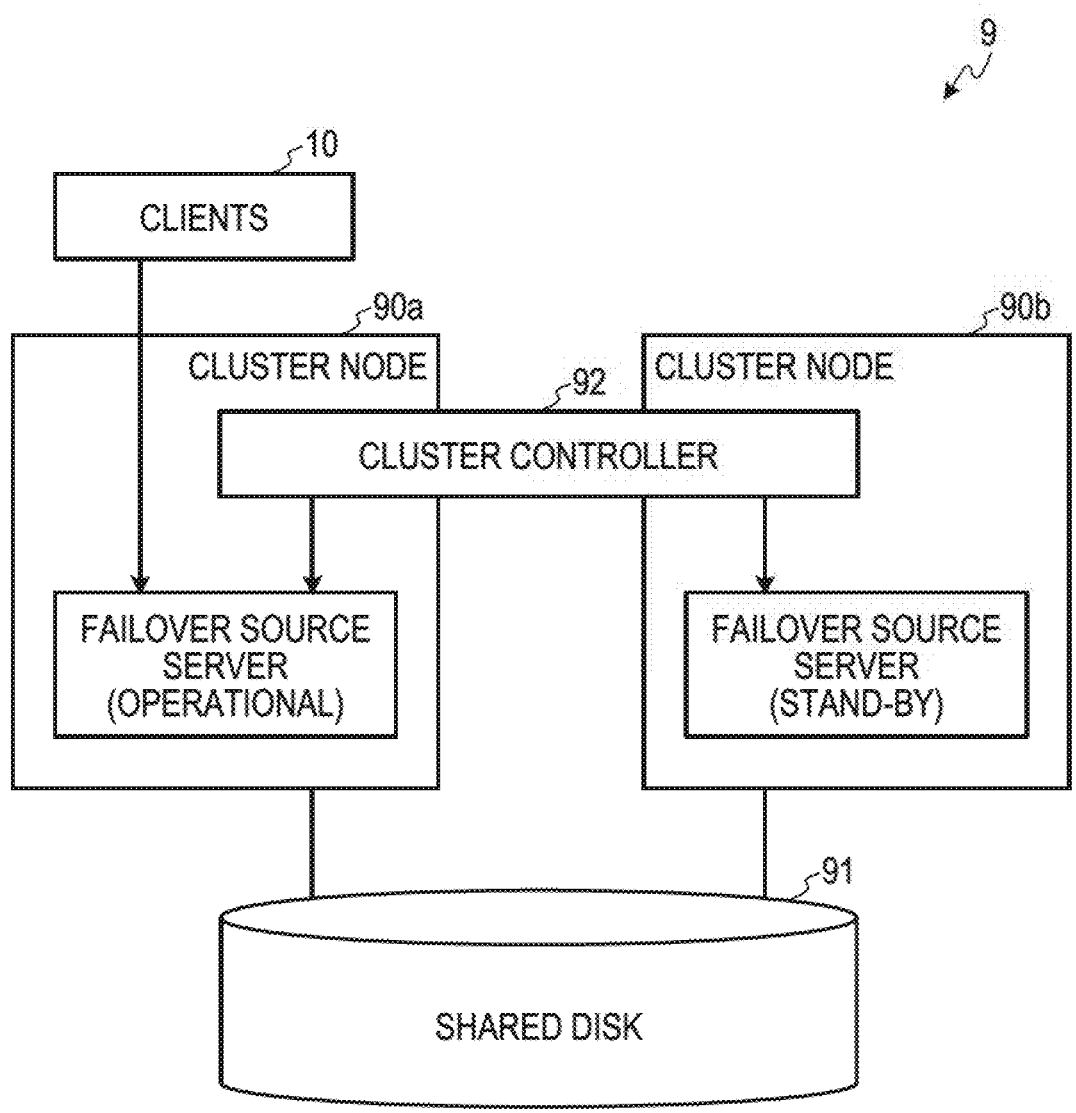

COMPUTER-READABLE RECORDING MEDIUM STORING CLUSTER SYSTEM CONTROL PROGRAM, CLUSTER SYSTEM, AND CLUSTER SYSTEM CONTROL METHOD

CROSS-REFERENCE TO RELATED APPLICATION

This application is based upon and claims the benefit of priority of the prior Japanese Patent Application No. 2008-287083, filed on Nov. 7, 2008, the entire contents of which are incorporated herein by reference.

FIELD

Aspects of the embodiment discussed herein are related to a computer-readable recording medium storing a cluster system control program, a cluster system, and a cluster system control method.

BACKGROUND

File server technology such as NAS (Network Attached Storage) that allows various types of clients to share electronic data is increasing in importance in the information society in which enormous amounts of electronic data are produced. NFS (Network File System) for UNIX (registered trademark)-based clients and CIFS (Common Internet File System) for Windows (registered trademark)-based clients are two mainstream file access protocols used by clients to access NAS.

There is a demand for improving the availability of such file servers because the file servers centrally manage electronic data. One technique to improve the availability is clustering in which a file server is built with multiple nodes. A NAS cluster system will be described with reference to FIG. 6, which illustrates an exemplary configuration of a conventional NAS cluster system 9.

As illustrated in FIG. 6, the NAS cluster system 9 includes cluster nodes 90a and 90b and a shared disk 91, which are connected to clients 10. The clients 10 are information processing apparatuses that send requests such as data write requests to the NAS cluster system 9 and may be personal computers, for example. The block "CLIENTS" 10 illustrated in FIG. 6 represents one or more information processing apparatuses. The term "request" as used herein refers to a request such as data write, data read, or data delete request sent from any of the clients 10. The shared disk 91 is a storage device storing user data and system data and is connected with the cluster nodes 90a and 90b.

In FIG. 6, the cluster node 90a is an operational node that provides services to the clients. The cluster node 90b is a stand-by node that takes over the cluster node 90a and provides services if the cluster node 90a stops operation because of a failure or maintenance. The cluster nodes 90a and 90b have a cluster controller 92. The cluster controller 92 controls which of the nodes 90a and 90b is to be activated. The cluster controller 92 deactivates the cluster node 90b while the cluster node 90a is active. On the other hand, the cluster controller 92 activates the cluster node 90b when the cluster node 90a is deactivated. The cluster node 90a or 90b controlled to be activated provides services to the clients 10.

Requests sent from the clients 10 to the NAS cluster system 9 described above are classified into two types: "idempotent" and "non-idempotent". An idempotent request is one that, when processed more than once, yields the same result. For example, "ls" (list segments) and "pwd" (print working directory) in UNIX (registered trademark) commands are idempotent requests.

On the other hand, a non-idempotent request is one that, when processed more than once, does not yield the same result. For example, "rmdir" (remove directory) and "mkdir" (make directory) in UNIX (registered trademark) commands are non-idempotent requests. Take, for example, "rmdir." If the cluster node 90a successfully executes "rmdir" to delete a directory and tries "rmdir" second and subsequent times, an error such as "ENOENT" (No such file or directory) will result.

When a client 10 detects that a request it sent has been lost, the client 10 resends the request. In such a case, the NAS cluster system 9 may accept the same request more than once. When the NAS cluster system 9 processes the request more than once, it would result in errors ("ENOENT" error in the above example) if the request is non-idempotent.

Therefore, the NAS cluster system 9 takes measures to handle non-idempotent requests accepted more than once. In particular, when the NAS cluster system 9 receives a request from a client, the NAS cluster system 9 stores information including a combination of an identification number ("xid") for identifying the request and reply data for the request in a cache called "DRC" (duplicate reply cache or duplicate request cache). Here, the "reply data for request" is data returned from the NAS cluster system 9 to clients 10. Information including a combination of "xid" and "reply data" stored in a DRC will be called "DRC information" herein.

When the NAS cluster system 9 accepts a request from any of the clients 10, the NAS cluster system 9 searches entries of DRC information stored in the DRC for an entry of DRC information that includes the same "xid" as that of the accepted request. If DRC information including the same "xid" is found in the DRC, the NAS cluster system 9 sends the reply data contained in the found DRC information to the client and then ends the process. With this, the NAS cluster system 9 prevents an error which would be caused by duplicate execution of a non-idempotent request if the NAS cluster system 9 has accepted the non-idempotent request more than once (B. Callaghan, NFS Illustrated, ISBN 0-201-32570-5, Addision-Wesley, 1999).

In general, the NAS cluster system 9 saves DRC information stored in a DRC in a NVRAM (Non Volatile Random Access Memory) accessible to both cluster nodes 90a and 90b. This is done to allow the DRC information to be taken over from the cluster node 90a to the cluster node 90b if failover occurs (S. Lawler, Active/Active Controller Configuration Overview and Best Practice Guidelines, TR3450-0107, Network Appliance Inc., January 2007)

SUMMARY

In accordance with an aspect of the embodiments, a computer-readable recording medium stores a cluster system control program controlling a cluster system in which clustered nodes are connected to a shared disk having a journaling file system. The cluster system control program causes a computer to execute a request reply information generation procedure for, when a request is accepted from a client, generating request reply information including an identification number identifying the request and reply data to respond to the request from the client, and a saving procedure for saving the request reply information generated by the request reply information generation procedure in the journaling file system.

Other embodiments in which any components, representations, or any combinations of components of the cluster system control program disclosed herein are applied to a method, apparatus, system, computer program, recording medium, or data structure are also effective.

BRIEF DESCRIPTION OF DRAWINGS

FIG. 6 is a diagram illustrating an exemplary configuration of a conventional NAS cluster system.

DESCRIPTION OF EMBODIMENTS

The conventional NAS cluster system described above has an issue that implementation of the function of saving DRC information adds to hardware development cost. In particular, the conventional server cluster system saves DRC information in an NVRAM as described above. Since typical server-cluster systems do not include an NVRAM, an NVRAM, which is expensive hardware, must be newly added in order to implement the function of saving DRC information. This adds to the cost of server cluster system.

The technique disclosed herein has been devised in order to resolve the issue with the conventional technique described above and has an object to provide a cluster system control program, cluster system, and cluster system control method capable of implementing the function of saving DRC information without adding to development cost.

A certain aspect of embodiment of a cluster system control program, cluster system, and cluster system control method disclosed herein will be described below in detail with reference to the accompanying drawings. It should be noted that the description of the embodiment is not intended to limit the cluster system control program, cluster system, and cluster system control method disclosed. The embodiment will be described with respect to an example in which the cluster system control program, cluster system, and cluster system control method are applied to an NAS cluster system that uses NFS. However, the cluster system control program, cluster system, and cluster system control method disclosed herein are also applicable to any other cluster systems such as NAS cluster systems that use CIFS.

An overview of an NAS cluster system 1 according to an embodiment will be described first. The NAS cluster system 1 according to the present embodiment includes a journaling file system in a shared disk. When the NAS cluster system 1 accepts a request from a client, the NAS cluster system 1 stores the result of processing of the request and DRC information corresponding to the request in the journaling file system.

Unlike conventional NAS cluster systems 9, a NAS cluster system 1 saves the DRC information in the journaling file system in the shared disk, instead of an NVRAM. If a failover occurs in the NAS cluster system 1, DRC information stored in the journaling file system is turned over from one cluster node to another.

In this way, since the NAS cluster system 1 according to the present embodiment saves DRC information in the shared disk without needing new hardware, the function of saving DRC information in the NAS cluster system 1 may be implemented without adding to hardware development cost. Shared disks connected to NAS cluster systems in general include a journaling file system. Therefore, the NAS cluster system 1 according to the present embodiment may be implemented without newly providing a journaling file system.

Figure 1:
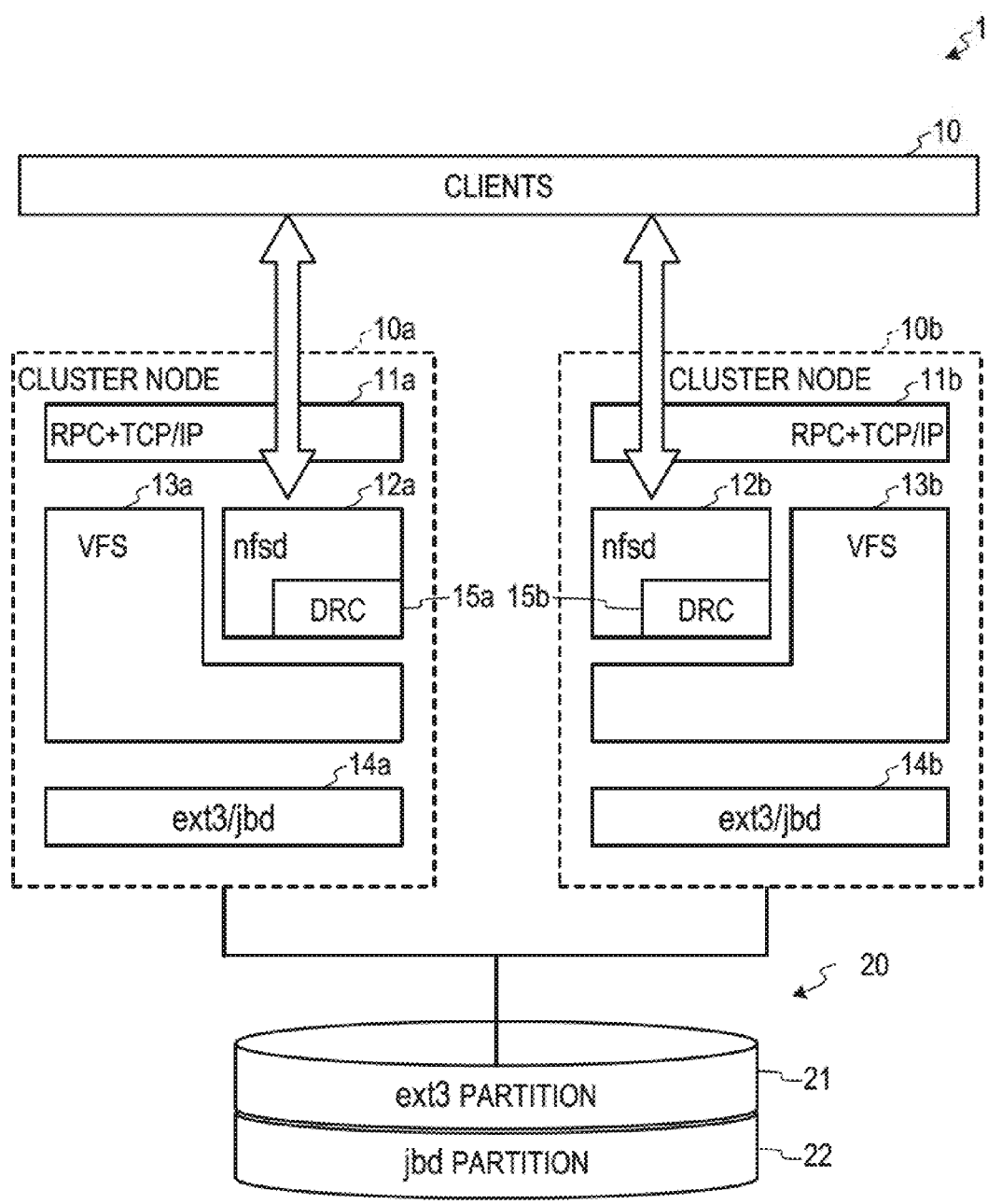
FIG. 1 is a diagram illustrating an exemplary configuration of a NAS cluster system.

A configuration of the NAS cluster system 1 according to the present embodiment will be described below. FIG. 1 illustrates an exemplary configuration of the NAS cluster system 1 according to the present embodiment. As illustrated in FIG. 1, the NAS cluster system 1 includes cluster nodes 10a and 10b and a shared disk 20, which are connected to clients 10.

The shared disk 20 is a storage device storing data such as user data and system data and is accessed by the cluster nodes 10a and 10b. The shared disk 20 in the present embodiment includes at least a journaling file system. A journaling file system is a file system that has the function of atomically (indivisibly) handling a unit of updating (a transaction) that is consistent as a file system by using a separate device (or a dedicated file) called a "journal" (see "S. Tweedie, EXT3 Journaling Filesystem, Ottawa Linux Symposium, Ottawa Congress Centre, Ottawa, Ontario, Canada, Jul. 20, 2000" for further information). For example, the combination of a ext3 (third extended file system) and a jbd (journaling block device) which controls its journal data is well known.

The shared disk 20 illustrated in FIG. 1 includes an ext3 partition 21, which is an area for storing data such as user data and system data, and a jbd partition 22, which is an area used for managing journal data.

The cluster node 10a in FIG. 1 is an operational node and the cluster node 10b is a stand-by node. The components of the cluster nodes 10a and 10b have functions equivalent to each other. Therefore, the components of the cluster node 10a will be described below and the description of those of the cluster node 10b will be omitted.

The cluster node 10a includes an RPC (Remote Procedure Call)+TCP/IP (Transmission Control Protocol/Internet Protocol) 11a, an nfsd (Network File system Daemon) 12a, a VFS (Virtual File System) 13a, and an ext3/jbd 14a.

The RPC+TCP/IP 11a is responsible for processing in the RPC and TCP/IP layer. In particular, the RPC+TCP/IP 11a receives a request sent from any of the clients 10 and performs analysis of the received request in RPC and TCP/IP layers.

The nfsd 12a is a program (kernel daemon) of the NFS that resides in the cluster node 10a and includes a DRC 15a, which is an incore DRC controller. In particular, the nfsd 12a executes a request analyzed by the RPC+TCP/IP 11a through the VFS 13a and the ext3/jbd 14a, which will be described later. Then the nfsd 12a generates DRC information corresponding to the executed request and stores the generated DRC information in the DRC 15a.

The nfsd 12a sends only DRC information corresponding to a non-idempotent request that has been successfully executed to the ext3/jbd 14a. This is because the NAS cluster system 1 according to the present embodiment saves DRC information in the jbd partition 22 in order to avoid an error which would be caused by duplicated processing of the request.

In particular, duplicated processing of an idempotent request will not result in an error. Therefore, the cluster node 10a does not need to save DRC information corresponding to an idempotent request in the jbd partition 22 to allow the cluster node 10b to take over the DRC information. A failed non-idempotent request will result in an error regardless of whether processing of the request is duplicated or not. Therefore, the cluster node 10a does not need to save DRC information corresponding to the failed non-idempotent request in the jbd partition 22 to allow the cluster node 10b to take over the DRC information. For these reasons, the nfsd 12a sends only DRC information corresponding to a successfully executed non-idempotent request to the ext3/jbd 14a.

The VFS 13a is an abstraction layer above a file system and enables the clients 10 to access the file system by using various applications. In particular, when the VFS 13a accepts a request, the VFS 13a selects a file system relating to the request. Since the shared disk 20 in the example illustrated in FIG. 1 has an ext3 file system, the VFS 13a selects ext3 as the file system when the VFS 13a accepts a request from the nfsd 12a.

The ext3/jbd 14a includes data, devices, processes, and kernels for operating computer resources of an OS (operating System) and manipulates data. The term "ext3/jbd" as used herein refers to the combination of ext3, which is a file system, and jbd. Here, the ext3 is a journaling file system which functions in conjunction with jbd.

A jbd is originally a device driver intended to journal updates made to blocks forming an ext3 file system. However, the jbd in the present embodiment also stores DRC information generated by the nfsd 12a in the jbd partition 22.

In this case, the jbd stores the result of processing of a non-idempotent request that has been successfully executed and DRC information corresponding to the request in the jbd partition 22 within a single transaction. To accomplish this, the nfsd 12a starts and ends journal sessions in the ext3/jbd 14a in such a manner that the journal sessions overlap one another. As a result, the jbd may store atomically the result of the request and the DRC information corresponding to the request in the jbd partition 22.

Figure 2:
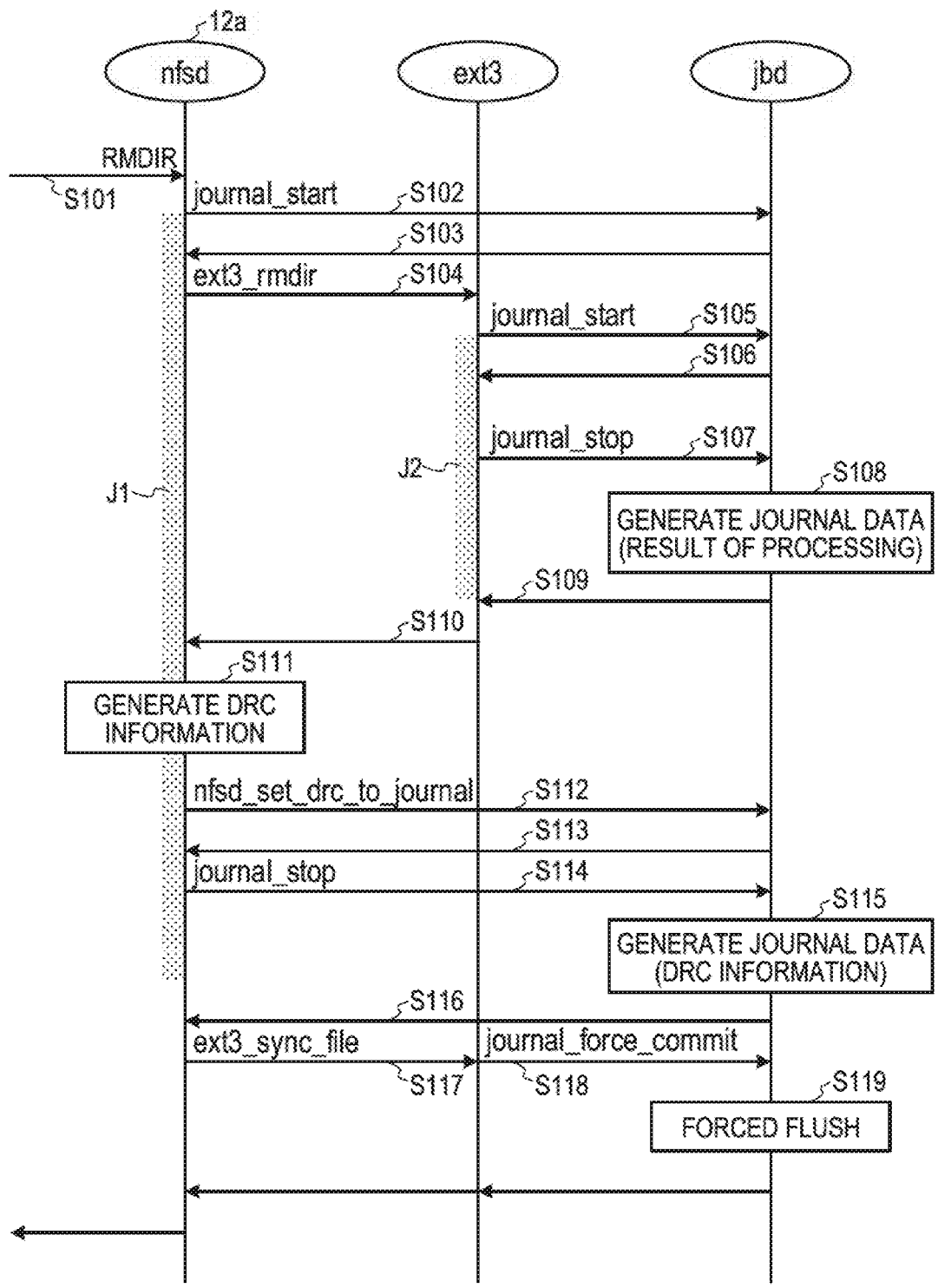
FIG. 2 is a sequence diagram illustrating a DRC saving process procedure performed by cluster nodes illustrated in FIG. 1.

A DRC saving process by the cluster node 10a illustrated in FIG. 1 will be described with reference to FIG. 2. FIG. 2 is a sequence diagram illustrating a DRC saving process procedure performed by the cluster node 10a illustrated in FIG. 1. Referring to FIG. 2, an exemplary process will be described which is performed by the cluster node 10a in response to a request "rmdir" received from one of the clients 10. The ext3 illustrated in FIG. 2 is the ext3 in the ext3/jbd 14a illustrated in FIG. 1 and the jbd illustrated in FIG. 2 is the jbd in the ext3/jbd 14a illustrated in FIG. 1.

As illustrated in FIG. 2, when the nfsd 12a accepts a request "rmdir" from any of the clients 10 (step S101), the nfsd 12a issues a command "journal_start" to start an update session (journal session) in a transaction (steps S102 and S103). The term "transaction" as used herein refers to a unit of processing that atomically updates the ext3 partition 21.

If there is not an active transaction, a transaction is newly generated. The journal session started at steps S102 and S103 is J1 illustrated in FIG. 2.

Then, the nfsd 12a issues a command "ext3_rmdir" to the ext3 through the VFS 13a, not illustrated (step S104). The ext3 receives the command and issues a command "journal_start" to start a journal session to the jbd (steps S105 and S106). The journal session started at steps S105 and S106 is J2 illustrated in FIG. 2.

The ext3 executes the command "ext3_rmdir", and then issues a command "journal_stop" to end the journal session 32 to the jbd (step S107). The jbd receives the command and generates journal data for storing the result of processing of "rmdir" in the jbd partition 22 (step S108).

Then, the nfsd 12a receives an indication that the journal session 32 has ended through the jbd and the ext3 (steps S109 and S110). The nfsd 12a generates DRC information (step S111). When "ext3_rmdir" has been successfully executed by the ext3, the nfsd 12a issues a command to store the generated DRC information in the jbd partition 22 ("nfsd_set_drc_to-_journal" in the example illustrated in FIG. 2) to the jbd (steps S112 and S113).

The nfsd 12a then issues a command "journal_stop" to end the journal session J1 to the jbd (step S114). The jbd receives the command and generates journal data for storing the DRC information generated at step S111 in the jbd partition 22 (step S115). The nfsd 12a then receives an indication that the journal session J1 has ended through the jbd and the ext3 (step S116).

Then, at a specific timing, the nfsd 12a issues a command "ext3_sync_file" to the ext3 to forcibly flush the transaction (step S117). The ext3 receives the command and issues a command "journal_force_commit" to the jbd (step S118). The jbd receives the command and executes the forced flush (step S119). In particular, the jbd stores transaction information including the journal data generated at steps S108 and S115 in the jbd partition 22. Here, the term "transaction information" refers to information including all journal data generated in a single transaction and other control data.

The NFS protocol specifies that the result of processing of a non-idempotent request is to be perpetuated before a successful reply message is sent. That is, the specific timing of the forced flush stated above is preferably immediately after step S116.

The update block data made up of the file system stored in the jbd partition 22 is asynchronously reflected in the ext3 partition 21 after the completion of the sequence illustrated in FIG. 2. The jbd deletes journal data corresponding to the block that has been reflected in the ext3 partition 21 from the jbd partition 22 as appropriate. In doing this, the jbd avoids deleting unexpired DRC information. The data deletion process (corresponding to a "DRC reuse process", which will be described later) will be described later with reference to FIGS. 4 and 5.

In this way, the cluster node 10a stores the journal data generated in the journal session 31 started at steps S102 and S103 and the journal data generated in the journal session 32 started at steps S105 and S106 in the jbd partition 22 within a single transaction. Consequently, the cluster node 10a may guarantee the atomicity of the process (request execution process) at step S108 and the process (DRC storing process) at step S115.

Figure 3:
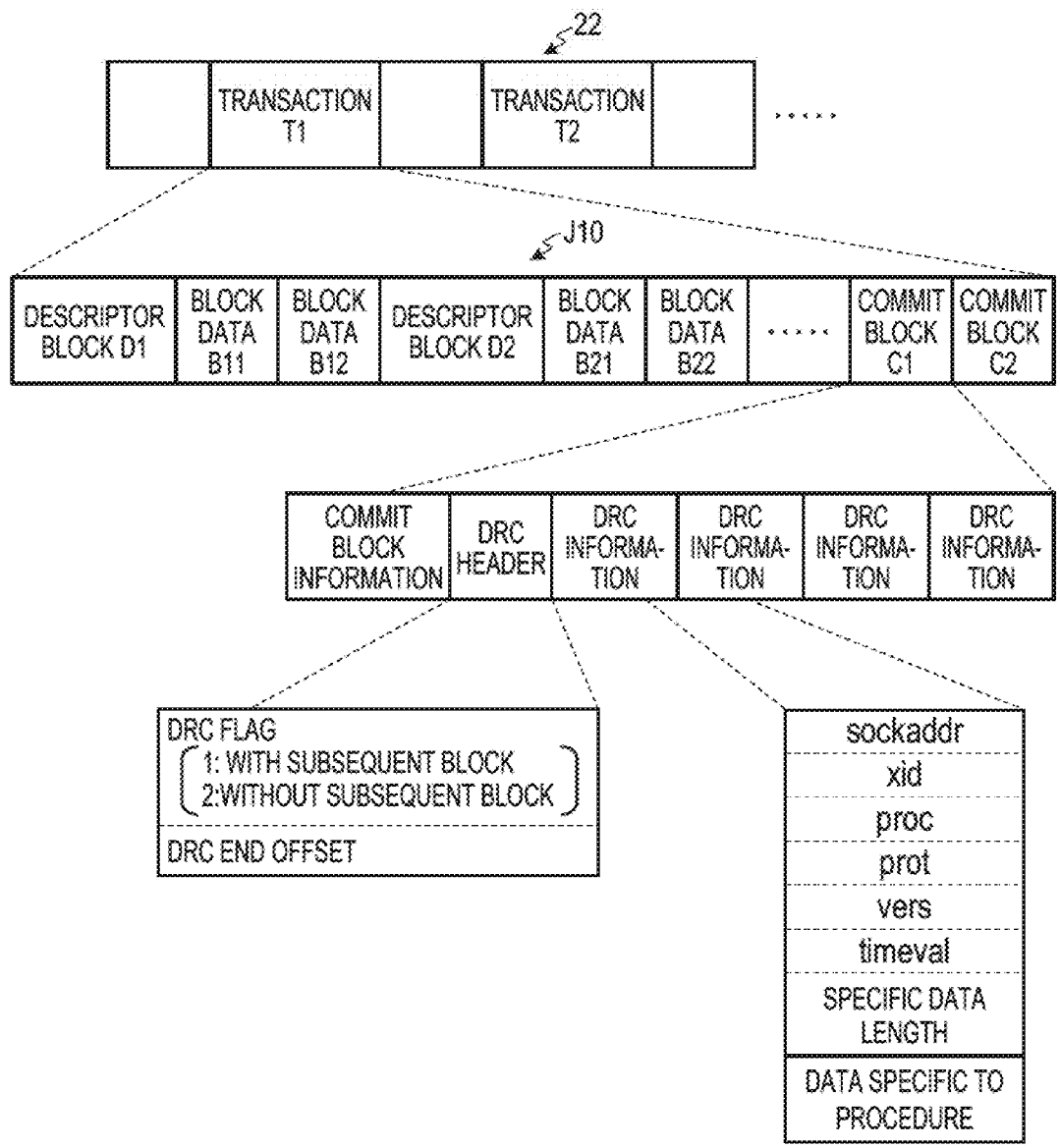
FIG. 3 is a diagram illustrating an exemplary configuration of a "jbd" partition.

A configuration of the jbd partition 22 illustrated in FIG. 1 will be described next. FIG. 3 illustrates an exemplary configuration of the jbd partition 22. The upper part of FIG. 3 illustrates a part of data stored in the jbd partition 22. The data stored in the jbd partition 22 is depicted as being separated into sections for individual transactions. In particular, the jbd partition 22 illustrated in the upper part of FIG. 3 contains data stored in transactions T1 and T2.

As illustrated in FIG. 3, combinations of a descriptor block and block data, and commit blocks are stored in the jbd partition 22.

In the example illustrated in FIG. 3, transaction T1 has a combination of descriptor block D1 and block data B11 and B12, a combination of descriptor block D2 and block data B21 and B22, and commit blocks C1 and C2.

The descriptor blocks D1 and D2 are fields that contain information indicating the type of block data that follows those descriptor blocks. For example, descriptor block D1 contains information indicating the type of block data B11 and B12. Descriptor block D2 contains information indicating the type of block data B21 and B22, for example.

The block data B11, B12, B21, and B22 represent fields that contain updated data. Here, the "updated data" is the information stored at step S108 in FIG. 2. The commit blocks C1 and C2 are fields that contain information indicating the end of the transaction.

Commit block C1 includes commit block information, a DRC header, and DRC information as illustrated in FIG. 3. While a configuration of commit block C1 is illustrated in FIG. 3, commit block C2 has the same configuration as commit block C1. The commit block information is a field that contains information indicating the end of the transaction.

The DRC header includes a DRC flag and DRC end offset. The DRC flag indicates whether the commit block C1 is followed by another commit block. It is assumed herein that the DRC flag "1" indicates that the commit block C1 is followed by another commit block and the DRC flag "2" indicates that the commit block is not followed by another commit block.

In the example illustrated in FIG. 3, commit block C1 is followed by commit block C2. Accordingly, the DRC flag of commit block C1 contains "1". Commit block C2 in the example in FIG. 3 is not followed by another commit block. Accordingly, the DRC flag of commit block C2 contains "2".

DRC information includes "sockaddr", "xid", "proc", "prot", "vers", "timeval", and procedure-specific data as illustrated in FIG. 3. The "sockaddr" field contains a socket address held by the client that sent the request. The "xid" field contains "xid" of the request.

The proc field contains a procedure. In the example illustrated in FIG. 2, the "proc" field contains "rmdir". The "prot" field contains the type of a protocol. In the present embodiment, the "prot" field contains "nfs". The "vers" field contains the version information of the protocol. For example, for the protocol "nfs2", the "vers" field contains "2".

The "timeval" field contains the time of validity of the DRC information. The time of validity is the time limit until which the DRC information is saved in the jbd partition 22 and may be set to the time at which the DRC information was generated plus 120 seconds, for example. The procedure-specific data field contains "reply data" for the request.

While an example in which multiple pieces of DRC information are stored in a commit block C1 is illustrated in FIG. 3, one commit block may contain one piece of DRC information. A case will be described where one commit block contains multiple pieces of DRC information. Since the nfsd 12a is a daemon capable of running more than one program thread simultaneously, the nfsd 12a may process more than one request simultaneously. The jbd, on the other hand, is capable of running only a single program thread at a time. Therefore, when the nfsd 12a processes more than one request simultaneously, the jbd processes the multiple requests in a single transaction generated by the nfsd 12a. In such a case, a commit block will contain more than one piece of DRC information.

In this way, DRC information is stored in commit blocks, which are also found in conventional journaling file systems. Conventional commit blocks contain only commit block information and the other fields are unused. The size of one block is typically 512 bytes whereas the size of commit block information is 16 bytes. Accordingly, a large part of a conventional commit block is unused. The NAS cluster system 1 according to the present embodiment stores DRC information in unused fields of commit blocks. Therefore, DRC information may be saved without taking up the space of the jbd partition 22.

Figure 4:
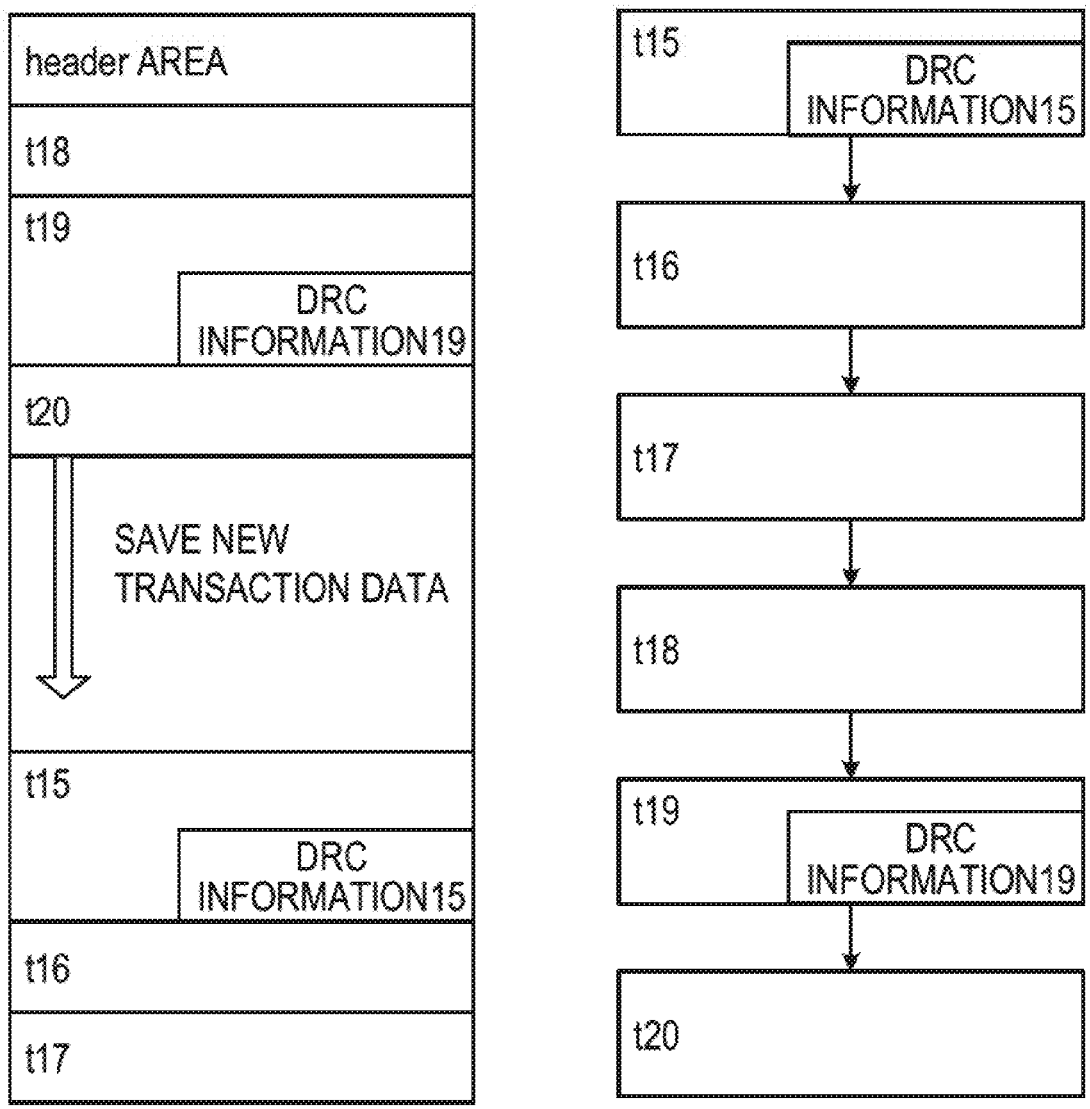
FIG. 4 is a diagram for explaining the reason why a DRC reuse process is performed.

A DRC reuse process performed by the ext3/jbd 14a illustrated in FIG. 1 will be described next. The reason why the DRC reuse process is performed will be described first with reference to FIG. 4. FIG. 4 is a diagram for explaining the reason why the DRC reuse process is performed.

The left-hand part of FIG. 4 illustrates exemplary data stored in the jbd partition 22. In FIG. 4, the data stored in the jbd partition 22 is depicted as being separated into sections for individual transactions. The right-hand part of FIG. 4 illustrates one example of an incore control table (also called "transaction control table" or "transaction list").

As illustrated in FIG. 4, DRC information 15 is stored in the jbd partition 22 in transaction t15. Also, DRC information 19 is stored in the jbd partition 22 in transaction t19. On the other hand, the incore control table contains information indicating that DRC information 15 has been stored in transaction t15 and DRC information 19 has been stored in transaction t19.

In conventional ext3/jbd 14, update block data stored in a jbd partition 22 is reflected in an ext3 partition 21 before a specific timing called "checkpoint" is encountered. Then, transaction information in which all update block data is reflected is freed (discarded) at the checkpoint. When transaction t15 is freed, DRC information 15 that has been stored in transaction t15 is also freed. Similarly, when transaction t19 is freed, DRC information 19 stored in transaction t19 is also freed. This poses the issue that DRC information 15 or 19 is freed before the time-of-validity of DRC information 15 or 19 expires.

Therefore, if DRC information is freed before its time-of-validity expires, the ext3/jbd 14a according to the present embodiment performs a process for saving the DRC information in a commit block in transaction information that is not yet discarded (DRC reuse process). This prevents the DRC information from being freed before the expiry of the time-of-validity.

Figure 5:
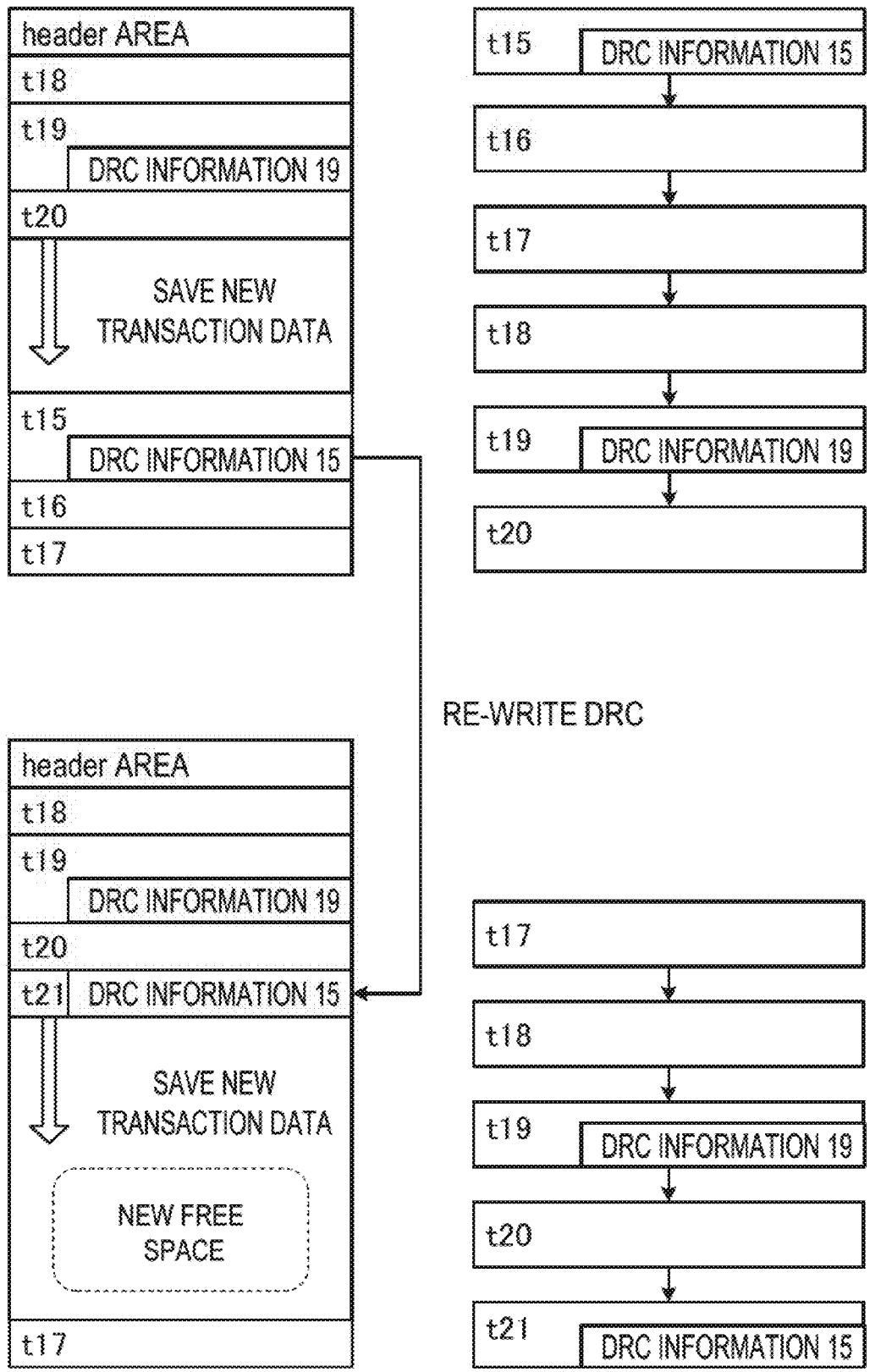
FIG. 5 is a diagram illustrating a DRC reuse process by "ext3/jbd"

The DRC reuse process will be described in further detail with reference to FIG. 5. FIG. 5 is a diagram illustrating the DRC reuse process performed by the ext3/jbd 14a. The upper part of FIG. 5 illustrates data stored in the jbd partition 22 illustrated in FIG. 4 and the incore control table.

It is assumed here that transactions t15 and t16 are freed at a specific checkpoint in the state illustrated in the upper part of FIG. 5. When this occurs, DRC information 15 would be freed as described above. Therefore, the ext3/jbd 14a saves DRC information 15 in a commit block generated in transaction t21 as illustrated in the lower left part of FIG. 5 if the time-of-validity of DRC information 15 has not yet expired.

In this way, the ext3/jbd 14a saves unexpired DRC information again as new transaction information as appropriate to prevent the DRC information from being freed. Thus, the DRC information may be saved in the jbd partition 22 during the duration of validity.

A recovery process performed by the NAS cluster system 1 in the event of a failover will be described next. It is assumed here that a failover occurs and the cluster node 10b takes over the cluster node 10a that has been processing requests from clients 10. In such a case, the cluster node 10b performs the recovery process by using various items of information stored in the jbd partition 22. The cluster node 10b performs control to prevent transaction information including unexpired DRC information from being discarded even after the recovery process has ended.

In particular, the cluster node 10b performs an update recovery process of the ext3 partition 21 based on transaction information saved in the jbd partition 22 and then performs control to prevent the unexpired DRC information in the transaction information used for the recovery process from being discarded.

The process will be described with respect to the example illustrated in FIG. 4. The assumption here is that the information illustrated in the left-hand part of FIG. 4 was stored in the jbd partition 22 at the time of the failover and the times-of-validity of DRC information 15 and 19 have not yet expired. Under these conditions, the cluster node 10b uses transaction information corresponding to transactions t15 from t20 to perform the update recovery process of the ext3 partition. In the following description, the transaction information corresponding to transactions t15 to t20 will be labeled transaction information ti15 to ti20, respectively.

A conventional cluster node would delete transaction information after the completion of an update recovery process of the ex3 partition. In contrast, the cluster node 10b in the present embodiment does not discard transaction information ti15 to ti20 used for recovery but rebuilds the incore control table (see the right-hand part of FIG. 4) corresponding to transaction information ti15 to ti20 after completion of the update recovery process of the ext3 partition 21. That is, the cluster node 10b reproduces the state of the transaction information and the information in the incore control table that the cluster node 10a had before the occurrence of the failover.

The cluster node 10b starts providing services to clients 10 and takes unexpired DCR information among the DRC information stored in the jbd partition 22 into the DRC 15b of the nfsd 12b. That is, the NAS cluster system 1 may restore the DRC information at proper timing for the cluster node. Therefore, the NAS cluster system 1 according to the present embodiment is capable of performing DRC restoration without changing the activation logic of an NFS server and lower-level file systems.

As has been described, the NAS cluster system 1 according to the present embodiment saves DRC information stored in a DRC into the journaling file system on the shared disk. Accordingly, the function of saving DRC information in the NAS cluster system 1 according to the present embodiment may be implemented without adding to hardware development costs.

The NAS cluster system 1 according to the present embodiment saves only DRC information concerning non-idempotent requests that have been successfully executed in the jbd partition 22. The NFS protocol specifies that the result of processing of a non-idempotent request from a client is preferably perpetuated (the result of processing is to be reflected in an ext3 partition 21) before a successful reply is sent to the client. Accordingly, for a successfully executed non-idempotent request, the NAS cluster system 1 accesses the ext3 partition 21. The NAS cluster system 1 according to the present embodiment does not suffer from degradation of performance as compared to systems using NVRAM like the conventional NAS cluster system 9, because the DRC saving process is piggy-backed onto the process for perpetuating the result of processing which has been conventionally performed. Therefore, the NAS cluster system 1 according to the present embodiment is capable of implementing the function of saving DRC information without adding to hardware development costs and also capable of preventing degradation of performance.

The components of the apparatuses illustrated represent functional concepts and do not necessarily need to be physically configured as illustrated. That is, specific forms such as distribution or integration of apparatuses are not limited to those illustrated. All or part of the apparatuses may be functionally or physically distributed or integrated in any form depending on workloads and use. All or any part of processing and functions of each apparatus may be implemented by a CPU or by a program analyzed and executed by the CPU or implemented as hardware by wired logics.

The control program described in the present embodiment may be implemented by executing a program provided beforehand on a computer such as a personal computer or workstation. The program may be recorded on a computer-readable recording medium such as a hard disk, flexible disk, CD-ROM, MO, or DVD and read from the recording medium and executed by a computer. The program may be a medium that may be distributed through a network such as the Internet.

All or part of the various kinds of processing described as being automatically performed in the present embodiment can be manually performed, or all or part of the processing described as being manually performed can be automatically performed by any known method. The process procedures, control procedures, specific names, information including various kinds of data and parameters (in FIG. 3, for example) can be modified at will unless otherwise stated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable recording medium storing a cluster system control program controlling a cluster system in which clustered nodes are connected to a shared disk having a journaling file system, the control program causing a computer to execute:
    generating a request reply information corresponding to a non-idempotent request that has been successfully executed, when the non-idempotent request that has been successfully executed is accepted from a client, the request reply information including a result of the non-idempotent request, an identification number identifying the non-idempotent request and reply data to respond to the request from the client; and
    saving the result of the non-idempotent request and the request reply information generated by the generating procedure in the journaling system,
    the saving includes storing a first journal data for storing the result of the non-idempotent request and a second journal data for storing the request reply information in the journaling file system within a single transaction.

2. The computer-readable recording medium according to claim 1, wherein the non-idempotent request is a request which results in an error, when a cluster node successfully executes a processing and the cluster node executes the processing again.

3. The computer-readable recording medium according to claim 1, wherein the saving procedure saves the request reply information in a commit block of transaction information that is stored for each transaction in the journaling file system.

4. The computer-readable recording medium according to claim 2, wherein the saving procedure saves the request reply information in a commit block of transaction information that is stored for each transaction in the journaling file system.

5. The computer-readable recording medium according to claim 3, wherein the generating procedure adds time-of-validity information indicating a duration during which the request reply information is to be saved in the journaling file system to the request reply information; and wherein if the transaction information including the request reply information generated by the generating procedure is to be discarded and the time-of-validity of the request reply information has not expired, the saving procedure saves the request reply information in other transaction information.

6. The computer-readable recording medium according to claim 4, wherein the generating procedure adds time-of-validity information indicating a duration during which the request reply information is to be saved in the journaling file system to the request reply information; and wherein if the transaction information including the request reply information generated by the generating procedure is to be discarded and the time-of-validity of the request reply information has not expired, the saving procedure saves the request reply information in other transaction information.

7. The computer-readable recording medium according to claim 5, the cluster system control program further causing the computer to execute:

restoring for performing restoration processing by using the transaction information, if a failover occurs, and then discarding the transaction information other than the transaction information including the request reply information whose time-of-validity added by the generating procedure has not expired.

8. The computer-readable recording medium according to claim 6, the cluster system control program further causing the computer to execute:

restoring for performing restoration processing by using the transaction information, if a failover occurs, and then discarding the transaction information other than the transaction information including the request reply information whose time-of-validity added by the generating procedure has not expired.

9. The computer-readable recording medium according to claim 7, the cluster system control program further causing the computer to execute:

sending reply data responding to the request to the client when the cluster system accepts the request from the client, wherein the restoring procedure obtains request reply information saved by the saving procedure when failover occurs; and wherein, when the client system accepts the request from the client, the replying procedure sends the reply data included in the request reply information having the same identification number as the identification number of the request to the client among the request reply information obtained by the restoring procedure.

10. The computer-readable recording medium according to claim 8, the cluster system control program further causing the computer to execute:

sending reply data responding to the request to the client when the cluster system accepts the request from the client, wherein the restoring procedure obtains the request reply information saved by the saving procedure when failover occurs;

wherein, when the client system accepts the request from the client, the replying procedure sends the reply data included in the request reply information having the same identification number as the identification number of the request to the client among the request reply information obtained by the restoring procedure.

11. A cluster system in which clustered nodes are coupled to a shared disk having a journaling file system, the cluster system comprising:

a memory;

a processor coupled to the memory and configured to:

generate request reply information corresponding to a non-idempotent request that has been successfully executed and the request reply information including a result of the non-idempotent request, an identification number identifying the non-idempotent request and reply data to respond to the request from the client when the non-idempotent request that has been successfully executed is accepted from a client; and saving the result of the non-idempotent request and the request reply information in the journaling file system, the saving includes storing a first journal data for storing the result of the non-idempotent request and a second journal data for storing the request reply information in the journaling file system within a single transaction.

12. A cluster system control method of controlling a cluster system in which clustered nodes are coupled to a shared disk having a journaling file system, the method comprising:

generating request reply information corresponding to a non-idempotent request that has been successfully executed, when the non-idempotent request that has been successfully executed is accepted from a client, the request reply information including a result of the non-idempotent request, an identification number identifying the non-idempotent request and reply data to respond to the request from the client; and saving the result of the non-idempotent request and the request reply information generated by the generating procedure in the journaling file system, the saving includes storing a first journal data for storing the result of the non-idempotent request and a second journal data for storing the request reply information in the journaling file system within a single transaction.

13. The computer-readable recording medium according to claim 1, wherein the request reply information is a duplicate reply cache (DRC) information.

* * * * *